United States Patent [19]

Schupp et al.

[11] Patent Number: 4,713,406
[45] Date of Patent: Dec. 15, 1987

[54] BINDERS FOR CATHODIC ELECTROCOATING

[75] Inventors: Eberhard Schupp, Schwetzingen; Rolf Osterloh, Gruenstadt; Werner Loch, Erpolzheim; Klaas Ahlers, Muenster, all of Fed. Rep. of Germany

[73] Assignee: BASF Aktiengesellschaft, Ludwigshafen, Fed. Rep. of Germany

[21] Appl. No.: 934,623

[22] Filed: Nov. 25, 1986

[30] Foreign Application Priority Data

Nov. 29, 1985 [DE] Fed. Rep. of Germany ....... 3542170

[51] Int. Cl.$^4$ ............................................. C08L 63/02
[52] U.S. Cl. .................................... 523/415; 523/402; 523/414; 523/416; 525/504; 528/73; 528/111.3; 528/113; 528/339.3; 528/341
[58] Field of Search ................... 528/73, 111.3, 113, 528/339.3, 341; 523/414, 415, 416, 402; 525/504

[56] References Cited

U.S. PATENT DOCUMENTS

| | | | |
|---|---|---|---|
| 4,134,864 | 1/1979 | Belanger | 528/113 X |
| 4,176,221 | 11/1979 | Shimp | 528/113 X |
| 4,367,319 | 1/1983 | Pampouchidis et al. | 528/113 X |
| 4,515,911 | 5/1985 | Swider et al. | 523/416 X |
| 4,557,976 | 12/1985 | Geist et al. | |
| 4,568,729 | 2/1986 | Schupp et al. | |
| 4,647,604 | 3/1987 | Kempter et al. | 523/416 X |

FOREIGN PATENT DOCUMENTS

| | | |
|---|---|---|
| 0012463 | 6/1982 | European Pat. Off. |
| 0040867 | 11/1983 | European Pat. Off. |
| 1303480 | 1/1973 | United Kingdom |
| 1553036 | 9/1979 | United Kingdom |

*Primary Examiner*—Earl Nielsen
*Attorney, Agent, or Firm*—Keil & Weinkauf

[57] ABSTRACT

Binders for cathodic electrocoating which are based on polyadducts/polycondensates which carry basic nitrogen groups and are rendered water-dilutable by protonation with an acid, and one or more crosslinking agents for these polyadducts/polycondensates, their use and electrocoating baths prepared from them.

These binders essentially consist of a mixture of
(A) from 50 to 90% by weight of a polyadduct/polycondensate which carries basic nitrogen groups and is obtainable by reacting
  (a) an essentially epoxide-free adduct of a secondary amine and polyepoxide compound with
  (b) a condensate of a diamine/polyepoxide adduct which is prepared in the presence of excess diamine and separated off from excess diamine after complete conversion of the epoxide groups, with one or more mono- and/or dicarboxylic acids of not less than 6 carbon atoms.
(B) from 10 to 50% by weight of a crosslinking agent which does not react with component (A) at room temperature but reacts with the latter at elevated temperatures with crosslinking.

These binders are particularly useful for the cathodic electrocoating of electrically conductive substrates.

8 Claims, No Drawings

BINDERS FOR CATHODIC ELECTROCOATING

The present invention relates to binders which are rendered water-dilutable by protonation with an acid and which are suitable for the preparation of cathodic electrocoating finishes.

German Published Application No. DAS 2,057,799 describes a process for the cathodic electrophoretic deposition of a water-dispersed, ionic, organic resin which consists of a positively charged, amine-containing resin and a blocked, multifunctional isocyanate.

European Pat. Nos. 12,463 and 40,867 describe heat-curable coating materials which undergo crosslinking via a transesterification reaction. The crosslinking agents used contain β-hydroxy ester groups.

German Laid-Open Application No. DOS 2,737,375 discloses reaction products of polyepoxide resins with polyamines, which are reacted with not less than 2 moles of monoethoxide or of a $C_8$- to $C_{24}$-monocarboxylic acid per mole of the adduct, monoepoxides being preferred. The crosslinking agents used are aminoplasts and phenoplasts.

German Laid-Open Application No. DOS 3,311,514 describes urea condensates which are suitable as binder components in heat-curable finishes. In example 6 of this application, a urea condensate is used together with a condensate of a hexamethylenediamine/polyepoxide adduct and a dimerized fatty acid for the preparation of a cathodic electrocoating finish which possesses very good mechanical and anticorrosion properties at a baking temperature as low as 140° C. The only disadvantages of this binder are the slight surface roughness and a small tendency to sedimentation in the bath.

It is an object of the present invention to overcome the disadvantages described and to retain the otherwise good properties, especially the pH of >7 of the electrocoating bath, this pH affording effective protection against plant corrosion. We have found that this object is achieved by the novel binder composition according to the present invention.

The present invention relates to a binder for cathodic electrocoating, based on polyadducts/polycondensates which contain basic nitrogen groups and are rendered water-dilutable by protonation with an acid, and one or more crosslinking agents for these polyadducts/polycondensates, wherein the binder essentially consists of a mixture of (A) from 50 to 90% by weight of a polyadduct/polycondensate which carries basic nitrogen groups and is obtainable by reacting
  (a) an essentially epoxide-free adduct of a secondary amine and a polyepoxide compound with
  (b) a condensate of a diamine/polyepoxide adduct, prepared in the presence of excess diamine and isolated from excess diamine after complete conversion of the epoxide groups, with one or more mono- and/or dicarboxylic acids of not less than 6 carbon atoms, with the proviso that the reaction of (a) with (b) is carried out at about 100°-250° C., and (B) from 10 to 50% by weight of a crosslinking agent which does not react with component (A) at room temperature but reacts with it at elevated temperatures with crosslinking, the sum of the percentages stated under (A) and (B) being 100.

Condensate (b) of a diamine/polyepoxide adduct and a mono- and/or dicarboxylic acid of not less than 6 carbon atoms is preferably prepared in the presence of component (a).

Furthermore, it is preferable if the secondary amine used for the preparation of component (a) is partially or completely an amide-containing secondary amine obtained by reacting mono- and/or dicarboxylic acids of not less than 6 carbon atoms or their esters with diamines which carry one primary and one secondary amino group per molecule, the secondary amino group carrying a β-hydroxyalkyl group.

It is also preferable to use a dimerized unsaturated $C_{10}$–$C_{24}$-fatty acid (dimer fatty acid) as the dicarboxylic acid for the preparation of component (b), and a saturated or unsaturated $C_8$–$C_{24}$-fatty acid as the monocarboxylic acid.

The dialkylamine which contains 2 to 36 carbon atoms and may furthermore contain functional groups is preferably used as the secondary amine for the preparation of component (a).

Preferred crosslinking agents (B) are polyvalent blocked isocyanates, aminoplast resins or phenoplast resins, polyaminomethylated polyphenols, crosslinking agents which cure via ester aminolysis and/or transesterification, and urea condensates.

The present invention furthermore relates to the use of the novel binders, which are rendered water-dilutable by protonation with an acid, in the form of an aqueous dispersion which may contain pigments, organic solvents and/or other assistants, as coating materials, an aqueous coating bath for cathodic electrocoating, which contains from 5 to 30% by weight of the novel binder, and the article which has been provided with a coating and obtained by applying the novel binder or coating agent and carrying out baking.

Regarding the components of the binder according to the invention, the following may be stated specifically.

Component (A) is a polyadduct/polycondensate which carries basic nitrogen groups.

The conventional glycidyl polyethers of polyhydric phenols can be used as polyepoxides for the preparation of components (a) and (b). Examples of such polyhydric phenols are resorcinol, hydroquinone, p,p'-dihydroxyphenylpropane (bisphenol A), p,p'-dihydroxybenzophenone, p,p'-dihydroxydiphenyl, p,p'-dihydroxydiphenylethane, bis-(2-hydroxynaphthyl)-methane, 1,5-dihydroxynaphthylene and novolaks. Bisphenol A is preferred. The polyphenols can be converted to the polyepoxides by reaction with an epihalohydrin, in particular epichlorohydrin. Polyepoxides having a low molecular weight are formed when a large excess of an epihalohydrin is used, and those having a high molecular weight are obtained using a small amount of an epihalohydrin or by reacting a polyepoxide having a low molecular weight with a polyphenol. The novel binders are preferably prepared using diglycidyl ethers of bisphenol A, having an epoxide equivalent weight of from about 180 to about 2500.

To prepare component (a), the polyepoxides are reacted with secondary amines. The reaction can be carried out in the presence or absence of a solvent. The reaction temperature may be varied within wide limits. For example, temperatures of from 20° to 200° C. are suitable, gentle heating to 50°–150° C. being advantageous for achieving rapid reaction. Suitable secondary amines or secondary monoamines, e.g. methylethanolamine, ethylethanolamine, methylisopropanolamine or dialkanolamines, such as diethanolamine or diisopropanolamine. The secondary monoamines may also contain further functional groups provided that these do not interfere with the reaction of the secondary amines with the polyepoxides. Examples of such functional groups are hydroxyl groups as well as ester, ether and amide groups. An example of a suitable secondary monoamine possessing an amide group is the reaction product of a primary/secondary diamine, e.g. aminoethylethanolamine, and a carboxylic acid, since in this reaction the amide is predominantly formed from the primary amino group, and a secondary monoamine is thus produced. The stated secondary monoamines can be used alone or as a mixture; furthermore, secondary diamines and, in minor amounts, primary monoamines or primary/secondary or diprimary diamines may be employed. The diamines, which may or may not be present, may additionally contain other groups which do not interfere in the reaction with polyepoxides. For example amidoamines obtained from primary/secondary diamines, e.g. aminoethylethanolamine and dicarboxylic acids, e.g. dimerized $C_{10}$–$C_{24}$-fatty acids, may advantageously be used as secondary diamines.

For the preparation of component (a), the secondary amines are generally reacted with the polyepoxide compounds in amounts such that about one amino group of the secondary amine is employed per epoxide group of the polyepoxide compound.

To prepare component (b), a diamine/polyepoxide adduct is condensed with mono- and/or dicarboxylic acids. The stated adduct employed here is obtained by reacting one or more of the polyepoxide compounds described above, preferably polyepoxide compounds based on bisphenol A, with excess diamine, and separating off the excess after complete reaction of the epoxide groups. Particularly suitable diamines are primary diamines of 2 to 14 carbon atoms, which may furthermore contain other groups, e.g. ether groups. Examples of suitable diamines are ethylene diamine, 1,3-propylenediamine, 1,4-butylenediamine, 1,5-pentamethylenediamine, 2-methyl-1,5-pentamethylenediamine and particularly preferably hexamethylenediamine, as well as 4,7,10-trioxatridecane-1,13-diamine, 4,7-dioxadecane-1,10-diamine, 4,9-dioxadodecane-1,12-diamine, 4,4'-methylenebiscyclohexylamine, 1,4-cyclohexanediamine and isophoronediamine.

To prepare the diamine/polyepoxide adducts, the amine is generally initially taken and the polyepoxide compound added in the melt or as a solution. The reaction can be carried out at room temperature, but a higher temperature of about 40°–150° C. is advantageously chosen in order to increase the reaction rate. Usually from 2 to 10, preferably from 2.5 to 8, equivalents of the amine are employed per equivalent of epoxide. When the reaction is complete, the epoxide value (mole/100 g) has fallen to zero. The excess amine is then removed by heating the mixture under reduced pressure. In the case of relatively sparingly volatile amines, such as hexamethylenediamine, temperatures up to about 200° C. under 50 mbar are appropriate.

A convenient method of removing sparingly volatile amines is to use a falling film or thin film evaporator, which ensures substantial, if not complete, removal of even relatively high boiling diamines. The resulting diamine/polyepoxide adduct is then condensed with one or more mono- and/or dicarboxylic acids of not less than 6 carbon atoms. The acids may also be used in the form of their esters. In this case, the ester alcohol is eliminated during the condensation.

Examples of suitable monocarboxylic acids are α-ethylhexanoic acid, isononanoic acid, caprylic acid, apric acid, stearic acid, linoleic acid, linolenic acid and benzoic acid.

Examples of suitable dicarboxylic acids are adipic acid, sebacic acid, nonanedicarboxylic acid, decanedicarboxylic acid, dodecanedicarboxylic acid, dimerized, unsaturated $C_{10}$–$C_{24}$-fatty acids (dimer fatty acids), e.g. Pripol ®1014 from Unilever, and phthalic acid and terephthalic acid, as well as mixtures of these dicarboxylic acids.

The condensation of the diamine/polyepoxide adducts with the carboxylic acids is carried out at from 100° to 250° C., preferably from 150° to 200° C. To facilitate removal of the water formed during the condensation, a solvent which is suitable as an entraining agent, e.g. toluene or xylene, may be added.

The mono- and/or dicarboxylic acids are used in amounts such that there is less than one carboxyl group of the carboxylic acid per primary amino group of the diamine/polyepoxide adduct. In general, the ratio of primary amino groups to carboxyl groups is from 1.7:1 to 5:1.

The reaction of (a) and (b) is carried out at about 100°–250° C., preferably 150°–200° C. In many cases, it is advantageous to effect the condensation of the diamine/polyepoxide adduct with the mono- and/or dicarboxylic acids in the presence of component (a), since the condensation of (a) with (b) takes place simultaneously and thus saves a reaction step.

The nature of the condensation of (a) with (b) is not known exactly. Evidently, partial transfer of carboxylic esters from (b) to (a) or, where dicarboxylic acids are used, partial association of (a) and (b) via dicarboxylic acid bridges takes place. In many cases, particularly advantageous results can be obtained if components (a) contain amide groups, which can be achieved, for example by using the stated secondary amines obtainable by condensation of primary/secondary diamines with mono- or dicarboxylic acids.

The ratios in which the components (a) and (b) are used can be varied within wide ranges, for example from 0.1:1 to 9:1. Industrially, it is desirable to use a relatively large amount of the more readily obtainable component (a), and ratios of from about 1:1 to 3:1 are therefore preferred.

Suitable components (B) are essentially all crosslinking agents which can be used in cathodic electrocoating finishes.

Examples of suitable crosslinking agents (B) are aminoplast resins such as urea/formaldehyde resins, melamine resins or benzoguanamine resins, blocked isocyanate crosslinking agents, crosslinking agents which cure via ester aminolysis and/or transesterification and possess on average two or more activated ester groups per molecule, e.g. β-hydroxyalkyl ester crosslinking agents according to European Pat. No. 40,867 and carbalkoxymethyl ester crosslinking agents according to German Patent Application No. P 32 33 139.8, and urea condensates as described in German Laid-Open Application No. DOS -3,311,514.

The ratio of components (A) and (B) depends on the type and number of groups capable of crosslinking in the two components. In general, the ratio of (A) to (B) used is from 1:1 to 9:1, preferably from 1:1 to 5:1, particularly preferably from 1.5:1 to 4:1.

For the preparation of coating materials, other substances, such as pigments, assistants, solvents and curing catalysts, can be added to the binder.

The coating materials prepared in this manner can be applied to substrates, such as wood, glass, plastic or metal, by a conventional method, such as spraying, immersion, casting or knife coating.

Curing of the coatings is effected at from 80° to 220° C. for from 3 to 40 minutes, depending on the type of crosslinking agent.

After protonation with acids, the novel binders become water-dilutable and can be applied not only in a conventional manner but also by cathodic electrocoating. This procedure is used to coat electrically conductive substrates, such as metal articles or sheets of brass, copper, zinc, aluminum, iron and steel, which may or may not be chemically pretreated, e.g. phosphatized.

The binders can be protonated using inorganic or organic acids. Formic acid, acetic acid, propionic acid, lactic acid and phosphonic acid are particularly suitable for this purpose. For cathodic electrocoating, the solids content of the electrocoating bath is generally brought to 5–45, preferably 10–30, % by weight. Deposition is usually effected at from 15° to 40° C. for from 30 to 360 seconds. The pH of the bath is brought to 4.5–9.0, preferably 5.0–8.0, particularly preferably 6.8–8.0. The deposition voltage is set at from 50 to 500 volt. The article to be coated is made the cathode, and the deposited film is baked at >90° C.

PREPARATION OF COMPONENTS (A)

Component (A 1):

First, a secondary diamine carrying amide groups was prepared. To do this, 290 g of dimer fatty acid (Pripol 1010 from Unichema, containing not more than 3% of trimer and 1% of monomer) and 104 g of N-aminoethylethanolamine were heated at 190°–195° C. in a reactor until 18 parts of water had distilled off.

In a second reactor, a diamine/polyepoxide adduct was prepared. To do this, 400 g of hexamethylenediamine were heated to 80° C., after which an 80% strength by weight solution of 400 g of a commercial epoxy resin based on 2,2-bis-(4-hydroxyphenyl)-propane and having an epoxide equivalent weight of 480, in toluene, was added. When the initial exothermic reaction had died down, the reaction was allowed to go to completion at 100° C. in the course of 30 minutes. Thereafter, excess hexamethylenediamine and toluene were distilled off under reduced pressure, the internal temperature reaching 180° C. The remaining traces of free amine were then stripped off in a thin film evaporator under 0.5 mbar and at 180° C. The product had an amine number of 160 mg of KOH/g and a softening point of 95° C.

In a further vessel, 105 g of commercial epoxy resin based on 2,2-bis-(4-hydroxyphenyl)-propane and having an equivalent weight of 480 were dissolved in 39 g of xylene. 11.06 g of methylethanolamine and 22.6 g of the amide-containing secondary diamine described above, which had been heated beforehand to 60° C. to make it easier to handle, were added at 70° C. When the exothermic reaction had died down, the mixture was kept at 100° C. for a further hour. Thereafter, 68.8 g of the diamine/polyepoxide adduct (as a solid) and 10.3 g of dimer fatty acid (Pripol 1010) were added, and the water formed was distilled off together with some of the xylene, until the temperature reached 195° C. After 30 minutes at this temperature, the mixture was cooled and, when it reached 100° C., diluted with 78 g of isobutanol to a solids content of 70% by weight. The viscosity of the product was 1800 mPas, measured at 75° C. using a plate-and-cone viscometer from Epprecht.

Component (A 2):

250 g of the epoxy resin used for the preparation of component (A 1) and having an epoxide equivalent weight of 480 were dissolved in 52 g of xylene, 37.5 g of methylethanolamine were added and the mixtures was heated to 100° C. for 1 hour. Thereafter, 287.5 g of the diamine/polyepoxide adduct described for component (A 1) and 72 g of dimer fatty acid (Pripol 1010) were added, and water was separated off in the course of 90 minutes, the temperature increasing to 190°–195° C. toward the end of this separation procedure. The mixture was cooled to 100° C. and then diluted with 223 g of isobutanol to a solids content of 70% by weight. The product had a viscosity of 1360 mPas, measured at 75° C., and an acid number of from 2 to 3 mg of KOH/g.

Component (A 3):

1000 g of an epoxy resin based on bisphenol A and having an epoxide equivalent weight of 490 were melted together with 50 g of xylene. 215 g of the amide-containing secondary diamine used for the preparation of component (A 1) and 147.5 g of diethanolamine were added at 60° C., and the mixture was heated at 100° C. for 1 hour. Thereafter, 579 g of the diamine/polyepoxide adduct described for component (A 1), 62 g of dimer fatty acid (Pripol 1010) and 30.5 g of linseed oil fatty acid were added and the mixture was then heated. Above about 150° C., the water liberated during amide formation was separated off and the temperature was slowly increased. After 2 hours, the reaction was complete and the temperature was 195° C. The mixture was cooled and, at 100° C., diluted with 718 g of isobutanol to a solids content of 70% by weight. The product had a viscosity of 1360 mPas measured at 75° C.

Component (A 4) (Comparative example):

Initially, the procedure described for component (A 2) was followed and component (a2) was prepared from an epoxy resin and methylethanolamine. Component (a2) was then diluted with isobutanol to 70% by weight.

In a second vessel, component (b2) was prepared from the diamine/polyepoxide adduct and dimer fatty acid (Pripol 1010) with the addition of a little xylene and while separating off water at from 190° to 195° C. The mixture was cooled to 100° C. and then diluted to 70% by weight with isobutanol. The components were mixed in a ratio of 2 g of (a2) and 1 part of (b2) at room temperature.

PREPARATION OF COMPONENTS (B)

Component (B 1):

504 g of trimerized hexamethylene diisocyanate were dissolved in 382 g of methyl isobutyl ketone. 388 g of dibutylamine were added dropwise to the cooled solution at 70° C., and stirring was continued until the isocyanate value was close to zero. The product had a solids content of 70% by weight.

Component (B 2):

1340 g of trimethylolpropane, 3600 g of urea, 3870 g of dibutylamine, 1740 g of hexamethylenediamine and 3570 g of 3,3'-dimethyl-4,4'-diaminodicyclohexylmethane were slowly heated. Above 120° C., ammonia was eliminated and the urea went into solution. The temperature was increased to 155° C. in the course of 2 hours, vigorous refluxing taking place and large amounts of a soft, crystalline deposit being precipitated. After a further 5 hours under reflux, the precipitate had dissolved again and the temperature had reached 165° C. 3870 g of dibutylamine were then added dropwise in the course of 2 hours and, when the addition was complete, the mixture was heated at 185° C. for a further 8 hours. At this temperature, 3600 g of dibutylamine were then stripped off under reduced pressure, and the residue was cooled to 130° C. and diluted with 5170 g of toluene. The product was a colorless, viscous liquid having a solids content of 70% by weight.

Component (B 3):

The polyester from Example II d) of European Pat. No. 40,867, which crosslinks via transesterification, was prepared.

seconds and the stated voltage on zinc-phosphatized steel test panels which had been made the cathode, and were baked for 20 minutes at 170 ° C. The table below shows the results.

| | | | Results of coating test, layer thickness 17 μm | | | |
|---|---|---|---|---|---|---|
| Example | pH | Voltage (V) | Throwing power according to Ford (cm) | Cupping[3] (Nm) | Salt spray test according to ASTM Under-penetration of the crack | Coating surface[1] |
| 1 | 7.6 | 300 | 23.0 | 18.08 | After 500 hours 0.1 mm | 1 |
| 2 | 7.6 | 310 | 22.0 | 18.08 | After 500 hours 0.2 mm | 1 |
| 3 | 7.15 | 300 | 20 | 18.08 | After 500 hours 0.3 mm | 2 (slightly dull) |
| 4 | 7.7 | 320 | 22.5 | 18.08 | After 500 hours 0.2 mm | 1 |
| 5 | 7.3 | 300 | 20.5 | 18.08 | After 500 hours 0.1 mm | 1–2 |
| 7[2] | 8.0 | 290 | 22 | 18.08 | After 500 hours 0.3 mm | 3 |

[1] Rating: on a scale from 1 (very good) to 6 (inadequate)
[2] Corresponds to Example 7 of German Laid-Open Application DOS 3,311,514
[3] The cupping was determined according to ASTM D 2794 using a mandrel impact tester from Gardner.

EXAMPLES 1 TO 5 AND COMPARATIVE EXAMPLE

Preparation of dispersions

Components (A) and (B) were mixed in the ratios stated below, and 10% strength by weight acetic acid was added. The dispersion was then prepared by slowly adding water, while stirring.

| Dispersion of example | Component (A) | Component (B) | Acetic acid, 10% strength by weight | Water |
|---|---|---|---|---|
| 1 | 695 g (A1) | 298 g (B2) | 150 g | 3093 g |
| 2 | 695 g (A2) | 298 g (B1) | 150 g | 3093 g |
| 3* | 695 g (A3) | 298 g (B3) | 180 g | 3153 g |
| 4 | 695 g (A2) | 298 g (B2) | 150 g | 3093 g |
| 5 | 695 g (A3) | 298 g (B2) | 150 g | 3093 g |
| Comparative example[1] | 695 g (A4) | 298 g (B2) | 250 g | 2993 g |

*15 g of lead octoate (24% of Pb) were added prior to to the addition of water.
[1] Comparative example: despite the high degree of neutralization, the dispersion was very coarse-particled and settled out, so that it was impossible to prepare a coating bath.

Pigment paste:

168.7 g of butyl glycol, 600 g of water and 16.5 g of acetic acid were added to 525.8 g of component (A 1). 800 g of titanium dioxide, 11.0 g of carbon black and 50 g of basic lead silicate were then introduced. The mixture was milled in a ball mill to a particle size of less than 9 μm. The solids content was then brought to 49% by weight with water.

Electrocoating baths:

764 g of the pigment paste were added to each stirred dispersion. The baths were stirred for 120 hours at 28° C. Coating films were deposited in the course of 120

We claim:
1. A binder for cathodic electrocoating which is based on polyadducts/polycondensates which carry basic nitrogen groups and are rendered water-dilutable by protonation with an acid, and one or more crosslinking agents for these polyadducts/polycondensates, and essentially consists of a mixture of
  (A) from 50 to 90% by weight of a polyadduct/polycondensate which carries basic nitrogen groups and is obtainable by reacting
    (a) an essentially epoxide-free adduct of a secondary amine and polyepoxide compound with
    (b) a condensate of a diamine/polyepoxide adduct which is prepared in the presence of excess diamine and separated off from excess diamine after complete conversion of the epoxide groups, with one or more mono- and/or dicarboxylic acids of not less than 6 carbon atoms, with the proviso that the reaction of (a) with (b) is carried out at about 100°–250° C., and
  (B) from 10 to 50% by weight of a crosslinking agent which does not react with component (A) at room temperature but reacts with the latter at elevated temperatures with crosslinking, the sum of the percentages stated under (A) and (B) being 100.

2. A binder as claimed in claim 1, wherein the condensate (b) of component (A) is prepared in the presence of component (a).

3. A binder as claimed in claim 1, wherein some or all of the secondary amine used for the preparation of component (a) is an amide-containing secondary amine obtained by reacting mono- and/or dicarboxylic acids of not less than 6 carbon atoms or their esters with diamines which carry one primary and one secondary amino group per molecule, the secondary amino group carrying a β-hydroxyalkyl group.

4. A binder as claimed in claim 1, wherein a dimerized unsaturated $C_{10}$–$C_{24}$-fatty acid (dimer fatty acid) is used as the dicarboxylic acid for the preparation of component (b).

5. A binder as claimed in claim 1, wherein a dialkylamine which contains 2 to 36 carbon atoms and may also contain other functional groups is used as the secondary amine for the preparation of component (a).

6. A binder as claimed in claim 1, wherein the crosslinking agent (B) is a polyvalent blocked isocyanate, an aminoplast resin or a phenoplast resin, a polyaminomethylated polyphenol, a crosslinking agent which cures via ester aminolysis and/or transesterification, or a urea condensate.

7. An aqueous coating bath for cathodic electrocoating, containing from 5 to 30% by weight of a binder as claimed in claim 1.

8. An article provided with a coating and obtained using a binder as claimed in claim 1.

* * * * *